Patented Jan. 8, 1946

2,392,738

UNITED STATES PATENT OFFICE 2,392,738

PROCESS OF AROMATIZING HYDROCARBONS

Clinton H. Holder, Cranford, and Albert B. Welty, Jr., Mountainside, N. J., assignors to Standard Oil Development Company, a corporation of Delaware No Drawing. Application August 26, 1944, Serial No. 551,432

6 Claims. (Cl. 260—673.5)

The present invention relates to improvements in the "hydroforming" of hydrocarbons. The object of our invention is to prepare a catalyst which is superior to those previously employed in its capability of converting the naphthenes as well as a substantial amount of the noncyclic components in petroleum naphthas to aromatic compounds thereby producing gasolines of high octane number. A secondary purpose of the catalyst is to provide a means of removing sulfur from the naphtha during the reforming operation.

By "hydroforming" we refer to an operation in which hydrocarbons, such as petroleum naphtha, are subjected at high temperatures and pressures to a catalytic conversion conducted in the presence of added hydrogen and a solid catalyst whereby the feed stock is converted to a product enriched in aromatics, and is further characterized in that there is no net consumption of hydrogen during the process. The essential reaction is one of dehydrogenation and is most commonly carried out on feed stocks which are naphthenic in character. Thus, for example, a feed stock containing methylcyclohexane when subjected to hydroforming conditions is converted to a product containing substantial quantities of dehydrogenated methylcyclohexane or toluene.

In brief compass, our invention relates to improvements in hydroforming operations in which we employ a new class of reforming catalysts. It is characterized in more detail by the fact that we propose to use a mixture of zinc oxide and alumina, combined to form a spinel structure, as a base for the catalyst. The active component of the catalyst is cobalt molybdate. As will be shown in the following paragraphs this catalyst possesses high activity when used to hydroform petroleum naphthas.

As mentioned above substantial desulfurization of naphthas high in sulfur content occurs when the catalyst described herein is employed. With the well known molybdena on alumina type hydroforming catalysts desulfurization occurs through chemical combination between the molybdena and the sulfur contained in the naphtha and is therefore limited by the amount of molybdena present in the catalyst which may therefore control the length of the reaction cycle. However when cobalt molybdate is used as the active catalyst component the majority of the sulfur removal is achieved by elimination as hydrogen sulfide, which reaction is not limited by the catalyst composition and therefore cycle length need not be concerned with sulfur removal. In fact if it is desired merely to desulfurize the naphtha this may be accomplished in a continuous type of operation at a lower temperature, such as 500 to 800° F., in which case reactions other than sulfur removal do not take place to an appreciable content so that the cycle length may be very long due to the low rate of coke formation. Likewise product quality improvement such as octane number is not achieved in any sizeable degree.

We have been able to show that a zinc oxide and an alumina composition prepared in such a way as to have a spinel type structure gives a very active aromatization catalyst when employed as a base for certain metallic molybdates. Such a catalyst is capable not only of dehydrogenating naphthenes but also of aromatizing a certain portion of the paraffins so that greater yields of aromatics may be obtained than with an ordinary "hydroforming" catalyst which converts only a relatively small percentage of the paraffins, invariably present in the reaction zone during hydroforming, to aromatics. The following table compares the aromatics yield obtainable with catalysts of these two types, namely a molybdena on alumina as compared with a cobalt molybdate on zinc oxide-alumina spinel type catalyst. In carrying out this test, we subjected to aromatization a sample of n-heptane at a feed rate of 1.2 volumes of naphtha per volume of catalyst per hour at a temperature of 1000° F. while maintaining the reaction at atmospheric pressure. (No hydrogen was added to the reaction mass.)

| Feed | n-Heptane | n-Heptane |
|---|---|---|
| Catalyst | 92% $Al_2O_3$; 8% $MoO_3$ [1] | 80% $Al_2O_3$·ZnO; 20% $CoMoO_4$ |
| Conversion ........volume per cent.. | 50 | 79 |
| Aromatics yield............do.... | 24 | 44 |
| Gas...................weight per cent.. | 11.3 | 16 |
| Coke.......................do.... | 5.1 | 5.2 |

[1] Typical hydroforming catalyst of molybdena on alumina composition.

The above test shows the relative ability of the cobalt molybdate type catalyst and that of a molybdena on alumina to cyclicize a paraffin hydrocarbon such as n-heptane, thereby producing the corresponding aromatic compound namely toluene. The cobalt molybdate catalyst gave 44% aromatics as compared to 24% for the conventional catalyst.

Having demonstrated the cyclization ability of the cobalt molybdate on zinc aluminate type of catalysts by experiments on n-heptane the data shown below were obtained in order to show the superiority of this catalyst over the ordinary type of hydroforming catalysts when using a typical hydroforming feed stock. These data were obtained at 1000° F., 1.2 v/v/hr., atmospheric pressure without hydrogen addition using a 200–270° F. East Texas type naphtha.

| | Catalyst | |
|---|---|---|
| | 8% MoO₃; 92% Al₂O₃ ¹ | 80% Al₂O₃.ZnO; 20% CoMoO₄ |
| Conversion............volume per cent.. | 48 | 67 |
| Gross aromatics yield........do.... | 36 | 45 |
| Gas............weight per cent.. | 6 | 9.8 |
| Coke..................do.... | 4.6 | 8.1 |

¹ Typical hydroforming catalyst.

It thus appears that the cobalt molybdate on zinc aluminate catalyst is more active than an ordinary molybdena on alumina catalyst when using the above typical naphtha feed stock. Likewise if higher pressure such as 200 lbs./sq. in. were used and H₂ were included with the feed a similar comparison would result.

As regards the ability of the cobalt molybdate type hydroforming catalyst to remove sulfur it appears that this may be very effectively done during the course of the normal operating cycle. For instance the sulfur content of a naphtha containing about 1% may be reduced to 0.02% when using conventional hydroforming conditions consisting of a 4 hour cycle and 1 v/v/hr. In order to obtain a similar result with a molybdena on alumina catalyst it would be necessary to limit the reaction cycle to 2.6 hours.

In order to prepare the preferred form of the catalyst described above the zinc oxide-alumina spinel base is first prepared by the method described in the application of K. K. Kearby, Serial No. 521,663 filed February 9, 1944. In brief this consists of introducing an aqueous solution of sodium aluminate into an acidified (nitric acid) solution of zinc nitrate. Chemical reaction occurs between the sodium aluminate and zinc nitrate resulting in the precipitation of zinc aluminate which in effect is a mol to mol mixture of zinc oxide and alumina. The precipitate is filtered and washed free of sodium nitrate. When heated the above precipitate forms a spinel type structure which is the basis for the aromatization property associated with the catalyst in question.

In order to proceed with the catalyst preparation 1000 gms. of the washed, undried zinc aluminate is suspended in 6 liters of a 5% solution of cobalt nitrate solution. To this suspension is then added slowly with constant stirring 2 liters of a 10% solution of ammonium molybdate. This results in precipitation of cobalt molybdate which is absorbed by the zinc aluminate suspension. The resulting solid phase was then filtered, washed with distilled water and heated until dry at about 200° F. It was then calcined 3 hours at 1200° F.

The activity data quoted above were obtained on a catalyst containing 20% cobalt molybdate on zinc aluminate. This is a desirable composition although 5 to 30 weight per cent cobalt molybdate may be used. Instead of using cobalt molybdate we may use one of the following as the active catalyst: (1) cobalt tungstate, (2) cobalt chromate, (3) nickel molybdate, (4) nickel tungstate, (5) nickel chromate.

To recapitulate, our invention relates to the preparation and use of a highly active reforming and aromatizing catalyst consisting essentially of nickel or cobalt salt of the VI group acid-forming oxides, such as molybdenum, chromium or tungsten supported on a spinel base, preferably a zinc oxide, aluminum oxide spinel base. This catalyst not only has the desirable attributes of high activity in aromatizing paraffins and dehydrogenating naphthenes in hydroforming naphthas and similar reactions, but the active component of the catalyst, namely, the cobalt molybdate is effective in causing desulfurization of the naphtha in a continuous manner.

Numerous modifications of our invention will be apparent to those familiar with this art.

What we claim is:

1. The method of improving the aromaticity of a hydrocarbon which comprises contacting the hydrocarbon at elevated temperatures and pressures with a catalyst comprising the reaction product formed by combining mol for mol a VI group oxide with one of the class of nickel oxide and cobalt oxide, which reaction product is supported on a zinc spinel base.

2. The method of claim 1 in which the spinel base comprises at least 90 per cent of the catalyst composition by weight.

3. The method of claim 1 in which the catalyst consists of cobalt molybdate supported on a zinc spinel base.

4. The method of claim 1 in which the catalyst consists of nickel molybdate on zinc spinel.

5. The method of aromatizing normal paraffins which comprises contacting the said paraffins at elevated temperatures and pressures with a catalyst comprising one of the class consisting of cobalt molybdate and nickel molybdate supported on zinc spinel.

6. The method of forming aromatics which comprises contacting a hydrocarbon oil containing naphthenes and paraffins under reforming conditions with a catalyst consisting essentially of one of the class consisting of cobalt molybdate and nickel molybdate supported on zinc spinel.

CLINTON H. HOLDER.
ALBERT B. WELTY, Jr.